United States Patent [19]

Lee

[11] Patent Number: 4,664,802

[45] Date of Patent: May 12, 1987

[54] APPARATUS FOR CONTINUOUSLY SEPARATING LIQUID MIXTURES

[76] Inventor: Hyosong M. Lee, Malmvägen 20, S-14700 Tumba, Sweden

[21] Appl. No.: 793,100

[22] Filed: Oct. 29, 1985

[30] Foreign Application Priority Data

Nov. 1, 1984 [SE] Sweden ........................... 8405494

[51] Int. Cl.[4] ............................................. B01D 21/02
[52] U.S. Cl. ................................... 210/522; 210/535; 210/536; 210/537
[58] Field of Search ..................... 210/521, 522, 532.1, 210/533–537

[56] References Cited

U.S. PATENT DOCUMENTS

| 367,308 | 7/1887 | Macnab, Sr. et al. | |
| 3,666,111 | 5/1972 | Piekenrood et al. | 210/521 |
| 3,797,668 | 3/1974 | Piekenrood et al. | 210/522 |

FOREIGN PATENT DOCUMENTS

| 2344316 | 10/1977 | France . |
| 138899 | 8/1978 | Norway . |
| 379645 | 10/1975 | Sweden . |
| 417903 | 4/1981 | Sweden . |
| 8204346-4 | 7/1982 | Sweden . |

Primary Examiner—Frank Sever
Attorney, Agent, or Firm—Young & Thompson

[57] ABSTRACT

The invention relates to apparatus for continuously separating components of mutually different density from a liquid mixture. The apparatus includes a separation space which is divided by a partition wall into a primary separation chamber and a secondary separation chamber. The partition wall guides the flow of liquid in an S-shaped path prior to the liquid passing a lamella separator, a part of the liquid flow from the primary chamber to the secondary chamber being allowed to flow back to the primary chamber through an opening in one wall element.

10 Claims, 2 Drawing Figures

APPARATUS FOR CONTINUOUSLY SEPARATING LIQUID MIXTURES

The present invention relates to apparatus for continuously separating components of mutually different density from a liquid mixture, the apparatus comprising a tank which incorpoates a separation space, an inlet through which the liquid mixture to be separated is supplied to the chamber, an upper chamber-defining wall which slopes in relation to the horizontal plane and on which a lighter phase of the liquid mixture and readily separable particles are intended to be captured and passed to a light-phase outlet arranged at the highest end of the sloping upper chamber-defining wall, and a lamella separator unit arranged in the flow path of a heavier phase of the liquid mixture and leading to a heavy-phase outlet located at a lower level than the light-phase outlet.

Apparatus of this kind are known from the Swedish Patent Application No. SE-A-8204346-4. Such apparatus are suitable for separating each component which is lighter or heavier than the liquid phase in which said components are present. The apparatus is highly effective in separating liquid oil layers from cutting emulsions and de-greasing baths, and to free particles of water from oils. The apparatus is also effective in separating and carrying away foam from flotation plants.

When separating the components of cutting emulsion or like liquids suspensions contaminated with solid particles and containing oil with the aid of the apparatus embodiment illustrated in FIG. 3 of the aforesaid patent application, it has been found that the lamella assembly 12 has a tendency to become blocked by large oil-laden solid particles, such blocking of the assembly being liable to jeopardize the whole function of the separator.

In order to overcome this problem it is proposed in accordance with the present invention to arrange in the separation spaced a partitiion wall which divides the separation space into a primary separation chamber for pre-separation of coarse particles together with a lighter liquid phase through a light-phase primary outlet, and a secondary separation chamber for subsequent separation of lighter liquid phase and finer particles contained in the liquid entering from an outlet provided in the primary separation chamber with the aid of the lamella separator assembly arranged in the secondary separation chamber, and by providing the secondary separation chamber with a secondary outle for the light phase separated in the secondary separation chamber. This arrangement enables the components of a liquid mixture to be separated in two stages, wherewith in a first stage coarser particles are captured by the sloping upper wall and pre-separated with the lighter phase by being passed to a primary outlet, whereafter the components of the liquid mixture are after-separated chamber with the aid of the lamella separator assembly, wherewith residual light-phase liquid is captured in the lamella separator and passed upwardly to a secondary outlet, while smaller particles carried to the secondary separation chamber are also captured in the lamella separator so as to be either entrained with the light phase to the secondary outlet, or collected on the plates of the lamella separator so as subsequently to fall the bottom of the separation space. The partition wall is herewith arranged to prevent coarse particles from falling down directly into the lamella separator.

In accordance with one suitable embodiment of the invention a wall element in the separation space is arranged to both conduct the liquid mixture from the inlet into the primary separation chamber and also to guide to the secondary separation chamber liquid which has been primarily cleansed in the primary separation chamber.

For the purpose of facilitating circulation of the liquid and to recycle non-separated large particles to the primary separation chamber, the aforesaid wall element defines in the proximity of its upstream end a communication opening between the secondary separation chamber and the liquid inlet, thereby enabling a certain degree of recycling of liquid from the primary separation chamber, together with anylarger solids present in said liquid, through the ejector effect obtained at the communication opening in said wall element.

An advantage is also afforded when the lamella separator assembly is arranged in the outlet part of the secondary separation chamber, such an arrangement affording the best secondary separation effect.

A further advantage is afforded when the extension of the partition wall is such that the upper side thereof delimits the primary separation chamber 20 as to cause said chamber to narrow towards the primary outlet, at the same time as the undersurface of the partition wall captures the lighter phase containing finer particles and guides said lighter phase towards the secondary light-phase outlet.

In order to facilitate capture of larger solid particles on the inclined upper wall, air is supplied to the inlet through which the liquid mixture is charged to the tank, in order to introduce air into the liquid mixture prior to said mixture flowing into the primary separation chamber, these coarse particles being floated on air bubbles formed when the liquid flows into the primary separation chamber.

In accordance with one preferred embodiment of the invention, the sloping upper wall forms a common defining wall of the primary separation chamber and a heavy-phase collecting chamber, the extension of the collecting chamber being such as to afford favourable, calm flowing conditions.

In order to control the mutual levels of the liquid phases in the separation chambers and in the heavy-phase collecting chamber, the outlet from the collecting chamber is provided with a vertically adjustable spillway, in a manner known per se.

In accordance with another advantageous embodiment of the invention, the majority of the wall sections defining the primary and secondary separation chambers are conveniently joined together and capable of being lifted from the outer tank casing together with the lamella separator assembly therewith to facilitate dismantling of the apparatus and its assembly during maintenance work.

The invention will now be described in more detail with reference to the accompanying drawings, in which

BRIEF DESCRIPTION OF THE DRAWINGS

FIG. 1 illustrates a separation apparatus according to the present invention, comprising a tank 1 which defines a separation space for the (contaminated) liquid mixture to be separated, for example a cutting fluid comprising a mixture of oil and solid particles in suspension. The liquid mixture is introduced through an inlet conduit 2 into a primary separation chamber 3, which is defined upwardly by an upper inclined roof wall 4. A wall element 5 is herewith arranged to guide the flow of liquid mixture up towards the wall 4, which is arranged to capture readily separated coarser particles in a manner known per se, and to conduct the lighter liquid phase (the oil) towards a primary outlet 6 located in the region of the higher end of the wall 4. The bottom of the primary separation chamber 3 is formed by a wall element 7, which forms at the same time a partition between the primary separation chamber 3 and a secondary separation chamber 8. The partition wall 7 and the wall element 5 together define an outlet 9 from the chamber 3 leading to the secondary separation chamber 8.

Figure 1:
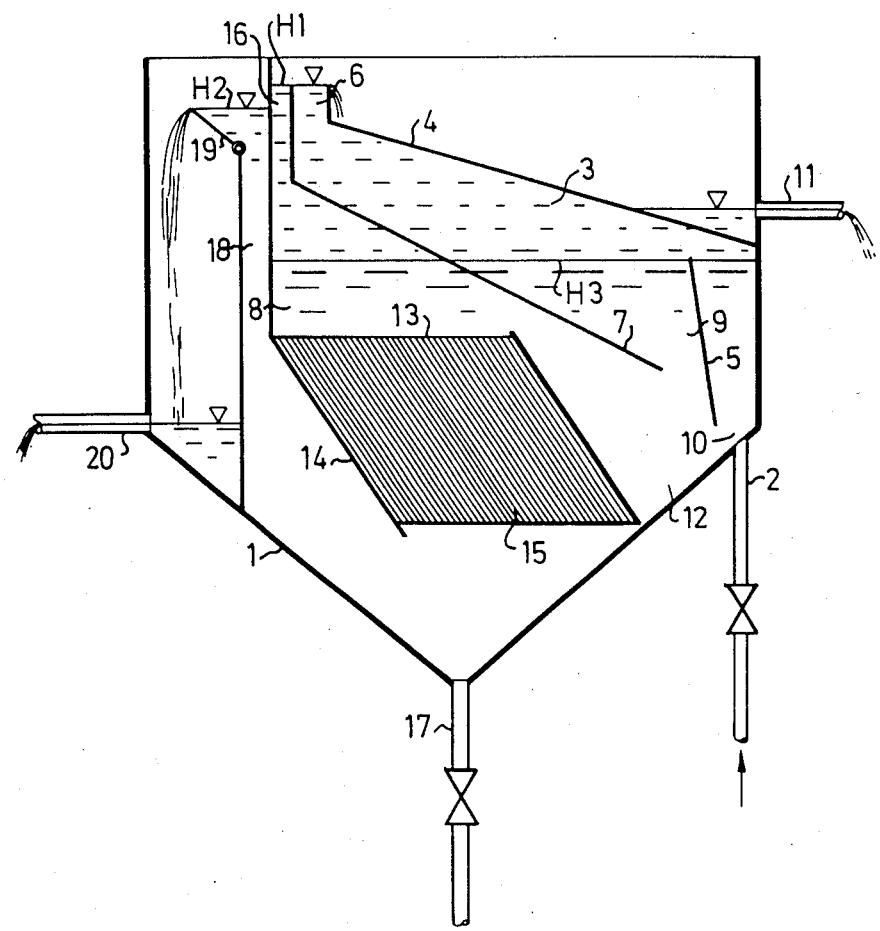
FIG. 1 is a schematic cross-sectional view of a first embodiment of the apparatus according to the invention.

The wall element 5 presents at its lower end an opening 10 at which a region of subpressure is created when liquid suspension from the inlet conduit 2 flows into the primary separation chamber 3. As a result of this ejector effect, coarser particles which, due to their size, do not settle on the inclined wall 4 during the first cycle of the liquid suspension in the chamber 3, are returned to said chamber and captured by the inclined wall 4 in a subsequent stage.

The lighter liquid phase (oil) is caused to rise towards the wall 4 in the primary separation chamber 3, and therewith up to a level H1 at the primary outlet 6 for the light phase. This light phase is able to run off the upper side of the roof wall 4 and flow out through a discharge pipe 11 extending from the tank 1.

The roughly cleansed and partially separated liquid suspension arriving from the outlet 9 of the chamber 3 and passing to the inlet part 12 of the secondary separation chamber 8 then flows—with the exception of the part recycling through the opening 10—up towards the inlet 13 of a lamella separator assembly 14, which comprises, in a known manner, a plurality of mutually parallel and densely arranged plates 15 inclined at a large angle to the horizontal plane.

It will be understood that the partition wall 7 prevents coarse particles from falling directly into the lamella separator 14, and that the wall 7 causes the liquid to flow in a substantially S-shaped path, such that the liquid mixture is cleansed and the components thereof separated in two stage, i.e. partly in a primary chamber 3 and partly in a secondary chamber 8.

The liquid suspension flowing into the secondary separation chamber 8 and possibly still containing a light liquid phase and finer contaminating particles, is subjected in said secondary chamber to a secondary separation process, or after-separation process, in which the lighter phase is again enabled to rise towards an outlet, namely a secondary outlet 16, along the underside of the partition wall 7. This lighter phase rises to the level H1 at the secondary outlet 16 either directly or along the inclined undersurface of the partition wall 7 or from the lamella separator 14, on the plates 15 of which residual light phase and fine particles are captured and can be caused to rise upwardly along the plates and from there to said secondary outlet 16. Particles which remain on the lamella plates 15 can be left to form large agglomerations, which subsequently fall to the bottom of the tank 1, from where they can be removed through a sludge outlet 17.

The liquid (water) constituting the heavy phase of the liquid suspension and flowing from the separator 14 rises to a level H2 in a collecting chamber 18, the upper part 19 of which forms a vertically adjustable spillway, over which the heavy phase is able to run to an outlet 20, through which the heavy phase is passed from the tank. The boundary H3 between the light and heavy phases in the separation chambers 3 and 8 is changed by adjusting the level H2 by means of the spillway 19. The location of the level H3 influences the purity of the phases at their respective outlets with respect to their content of the second phase. The extent to which the heavy liquid phase leaving via the spillway 19 is cleansed of the light phase is most pronounced when the spillway 19 is adjusted so that a slight trace of heavy phase is found in the light phase leaving through the primary outlets 6,16. This occurs when the boundary level H3 of the phases coincides, or substantially coincides, with the free level H1 of the light phase. Correspondingly, the light phase contains the least amount of heavy phase, i.e. is cleanest, when the light phase is only barely discernible in the heavy phase leaving at the level H2. This latter occurs when the boundary level H3 between the phases lies substantially on the level of the outlet (the underside) of the lamella separator 14.

Figure 2:
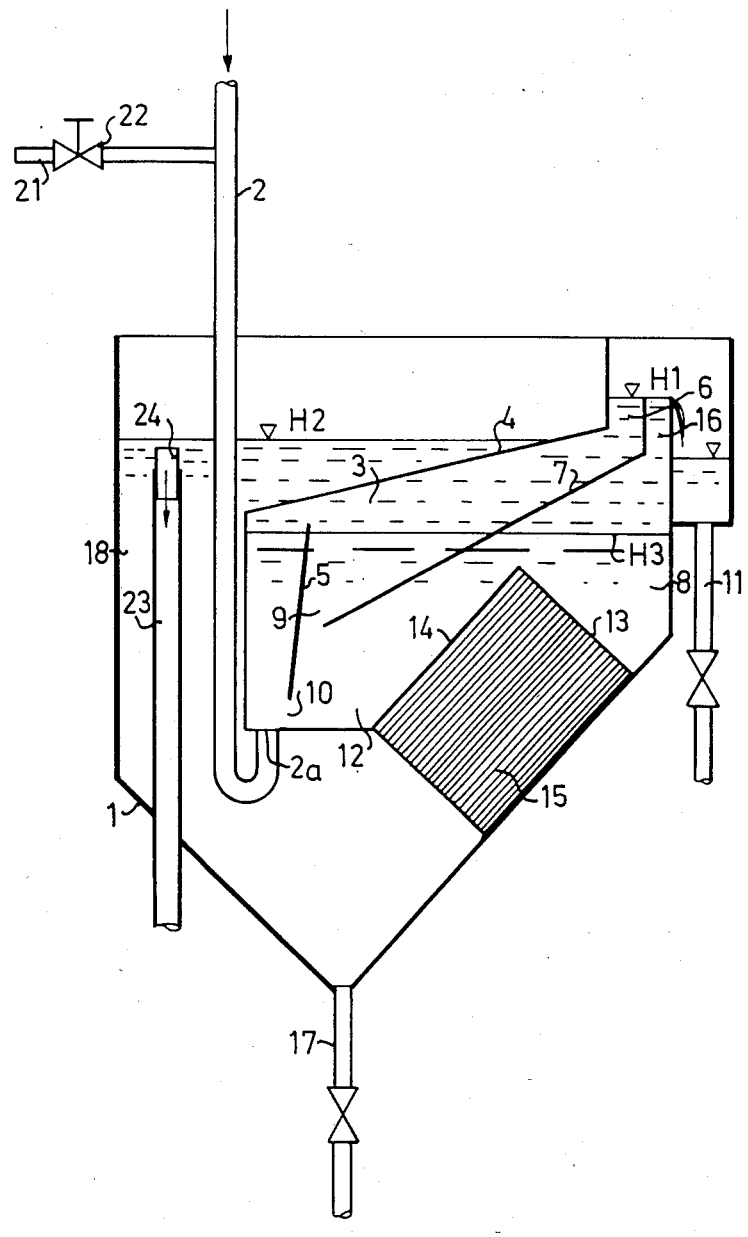
FIG. 2 is a schematic cross-sectional view of a second, preferred embodiment of the apparatus according to the invention.

FIG. 2 illustrates an alternative, preferred embodiment of the apparatus according to the invention. Components which are identical to the components of the FIG. 1 embodiment, or correspond to said components are identified by the same reference as those used in FIG. 1.

In the embodiment illustrated in FIG. 2 the liquid mixture to be separated into light and heavy phases is introduced into the separation space of the tank 1 through the inlet conduit 2, which extends from above, down into the tank to an inlet 2a. Connected to the inlet conduit 2 is a conduit 21 for supplying air to the liquid in the conduit 2. The amount of air supplied can be regulated by means of a valve 22. The air can be drawn into the conduit 2 by an injector effect, or can be supplied in the form of pressurized air. The air supplied to the liquid mixture forms air bubbles therein to which, inter alia, large solid particles in the liquid suspension tend to adhere when the liquid flows upwardly towards the inclined roof wall 4. The thus floated lighter phase is captured by the wall 4 and rises to the level H1 at the outlet 6 of the primary separation chamber 3. The extent to which solid, large particles are separated from the heavy phase is greater in this embodiment of the invention than in the embodiment illustrated in FIG. 1.

Similar to the apparatus illustrated in FIG. 1, the partially separated liquid from the chamber 3 passes out through the outlet 9 thereof, into the lower inlet part 12 of the secondary separation chamber 8, where, as a result of an ejector effect, some of the liquid is caused to flow back to the primary separation chamber 3, through the opening 10, thereby enabling any residual coarse particles to separate in the first separation chamber 3.

The partially separated liquid then flows upwardly in the second, secondary separation chamber 8, in which the lighter phase is given the opportunity of rising along the undersurface of the partition wall 7 and flowing to the secondary light-phase outlet 16 and further separation takes place on the plates 15 of the lamella separator 14.

The heavy phase flowing from the lamella separator 14 rises up in the collecting chamber 18, which in this embodiment of the apparatus has considerable horizontal extension and obtains therewith favourable, smooth flow conditions. This larger extension of the collecting chamber 18 can be achieved within the same tank width as that of the apparatus illustrated in FIG. 1, due to the fact that the inclined roof wall 4 is not utilized solely as a defining wall of the primary separation chamber 3 but also as a defining wall of the collecting chamber 18.

The cleansed heavy phase flows from the collecting chamber 18 through the upper outlet orifice of a waste pipe 23. The level H2 of the heavy phase, and therewith the boundary level H3 between the phases in the separation chambers 3 and 8, can be adjusted with the aid of a connector pipe 24 arranged telescopically on the waste pipe 23.

The majority of the wall sections defining the separation chambers 3 and 8, and the lamella separator 14 of both embodiments of the apparatus according to the invention can be mutually connected so as to enable them to be lifted together from the tank casing 1 when needing to carry out maintenance on the apparatus.

I claim:

1. Apparatus for continuous separation of a liquid mixture including a light and heavy phase, said apparatus comprising: means for providing a secondary separation of a light phase and finer particles to be attained prior to a liquid entering a lamella separator assembly, including, a tank enclosing a separation space; an inlet for introducing said liquid mixture to be separated into said separation space; a partition wall disposed in said separation space and dividing said separation space into mutually communicating primary and secondary separation chambers; an inclined upper wall upwardly delimiting said primary separation chamber, said upper wall being effective to capture said light phase of the liquid mixture and readily separate coarser particles contained therein and conduct said particles and said light phase to a light phase outlet disposed at the upper end of said inclined upper wall; said secondary separation chamber being located downstream of said primary chamber for after-separation of lighter liquid phase and finer particles from said liquid mixture arriving from an outlet of the primary chamber, by means of a lamella separator assembly disposed in said separation space in the flow path of said heavy phase and leading to a heavy phase outlet disposed at a lower level than said light phase outlet; wherein said partition wall and said lamella separator assembly are so disposed as to preclude direct settling of coarser particles in said lamella separator assembly, said partition wall having a lower surface adapted to capture any remaining light phase liquid flowing to said secondary chamber and to lead it to a secondary light phase outlet.

2. Apparatus according to claim 1, wherein said secondary separation chamber comprises an inlet disposed at a lower level than the inlet of said lamella separator assembly.

3. Apparatus according to claim 1, wherein said partition wall comprises an upper end forming a boundary wall common to both said primary and secondary light phase outlets.

4. Apparatus according to claim 1, wherein said separation space comprises a wall element so disposed as both to conduct the said liquid mixture from the said inlet into said primary separation chamber and to conduct the liquid primarily cleansed in said primary separation chamber to said secondary separation chamber.

5. Apparatus according to claim 4, wherein said wall element defines a communication opening between said secondary separation chamber and said liquid inlet, whereby the speed of injection of said liquid through said inlet effects circulation of said liquid from said secondary separation chamber to said primary separation chamber.

6. Apparatus according to claim 1, wherein said liquid inlet comprises means for supplying air to said liquid mixture prior to injection of said mixture into said primary separation chamber.

7. Apparatus according to claim 1, wherein said inclined upper wall forms a common boundary between said primary separation chamber and a heavy phase collecting chamber.

8. Apparatus according to claim 1, wherein said heavy phase outlet is a vertically adjustable spillway.

9. Apparatus according to claim 1, wherein a plurality of the wall sections defining said primary and secondary separation chambers are interconnected, thereby to form an assembly which can be lifted from said tank.

10. Apparatus according to claim 1, wherein said lamella separator assembly is disposed at the outlet of said secondary separation chamber.

* * * * *